United States Patent

[11] 3,549,158

| [72] | Inventor | Maxie H. Smith |
| | | Mc Ewen, Tenn. |
| [21] | Appl. No. | 736,535 |
| [22] | Filed | June 12, 1968 |
| [45] | Patented | Dec. 22, 1970 |
| [73] | Assignee | Southern Gage Company |
| | | Erin, Tenn. |
| | | a corporation of Tennessee |

[54] ARBOR ASSEMBLY
6 Claims, 7 Drawing Figs.

[52] U.S. Cl. .................................................. 279/2
[51] Int. Cl. ........................................... B23b 31/40
[50] Field of Search........................................ 279/23;
82/44; 294/86.24, 99; 242/72, 73; 269/48.1;
279/1(SG), 2

[56] References Cited
UNITED STATES PATENTS

| 2,996,301 | 8/1961 | Cox........................... | 279/2(UX) |
| 3,111,326 | 11/1963 | Sattler........................ | 279/2 |
| 3,113,744 | 12/1963 | Nisenson..................... | 279/2X |

*Primary Examiner*—Robert C. Riordon
*Assistant Examiner*—Donald D. Evenson
*Attorney*—Harness, Dickey and Pierce ABSTRACT: An arbor assembly comprising an elongated, generally cylindrical shaped body member and a plurality of at least two coaxially oriented work-holding members for detachably securing a workpiece on the body member, the workpiece holding members each comprising means defining a plurality of circumferentially spaced, longitudinally extending workpiece engaging jaw sections and means for supporting the jaw sections at a position spaced radially outwardly from the outer periphery of the body member, whereby the jaw sections are adapted to be received within and peripherally engage an annular bore in a workpiece and thereby exert outwardly directed compressive forces against the periphery of the bore so as to support the workpiece centrally of the body member.

PATENTED DEC22 1970
3,549,158
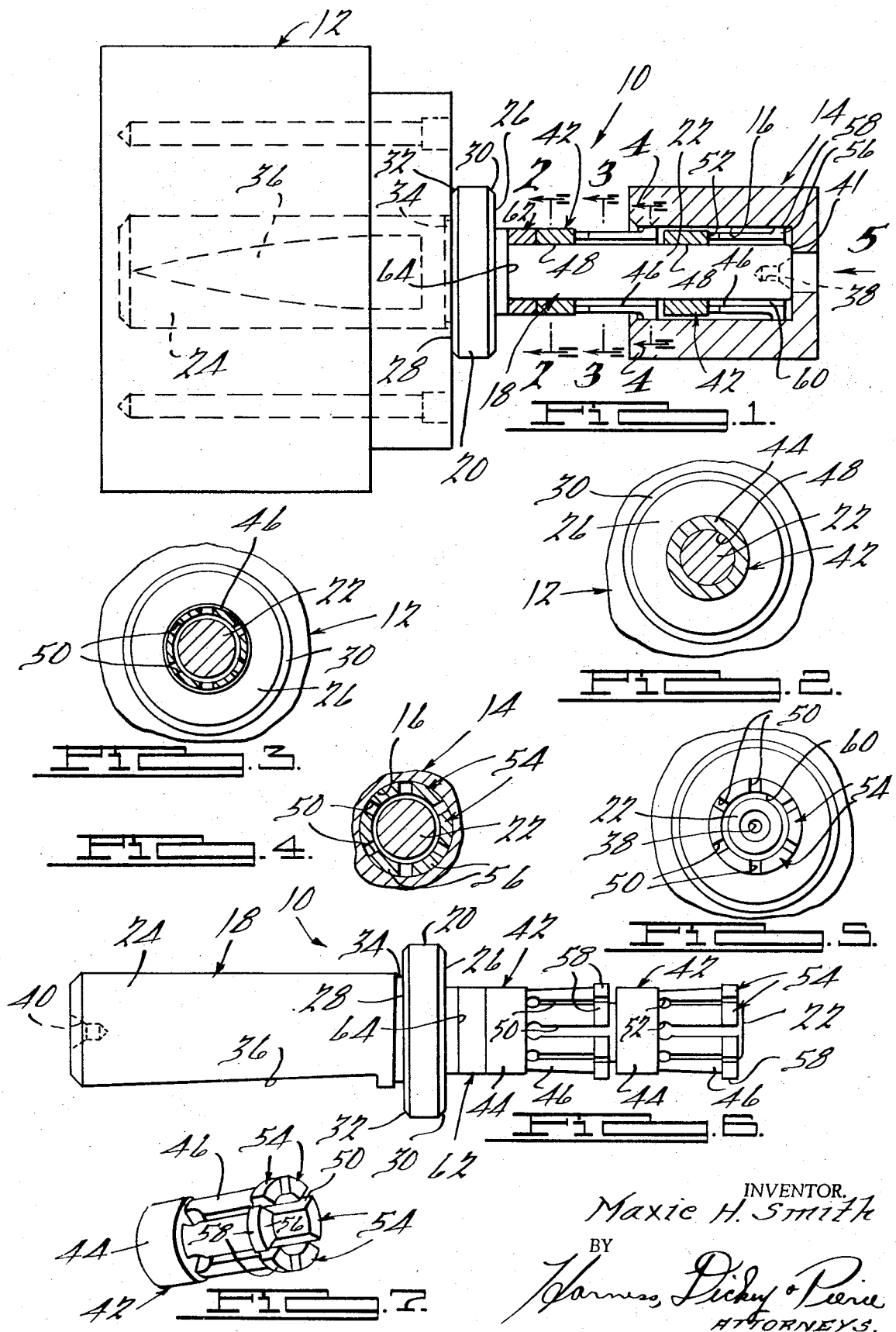
INVENTOR.
Maxie H. Smith
BY
Harness, Dickey & Pierce
ATTORNEYS.

ARBOR ASSEMBLY

BACKGROUND OF THE INVENTION

In order to accurately precision machine a workpiece, it is usually necessary that the means used to secure the workpiece relative to the machine tool serve a twofold purpose; first of all, the workpiece fastening or mounting means must securely fasten the workpiece in a manner such that the workpiece will remain fixedly mounted regardless of any external forces applied thereto, and secondly, the mounting means must assure precise axial alignment of the workpiece with respect to the associated machining or cutting tool during a machining process.

In the past, a variety of different type devices have been proposed, which devices, although performing satisfactorily, have proved to be too complicated or difficult to install. Still others have required an objectionably high amount of maintenance, while other devices have failed to fulfill the requisite need for stability in mounting the workpieces and maintaining the proper axial alignment thereof during the machining process.

In accordance with the principles of the present invention, a new and improved arbor assembly is provided which is adapted to overcome the objectionable characteristics of heretofore known and used workpiece supporting or mounting devices. Generally speaking, the arbor assembly of the present invention comprises an elongated, generally cylindrical shaped arbor body which is adapted to operatively support thereon one, two or more coaxially aligned workpiece supporting sleeve members, each of which is formed with a series of circumferentially spaced, longitudinally extending slots that define a plurality of workpiece engaging jaws. The sleeve members are secured to the arbor member in a manner such that the jaws thereof are equally radially spaced from the axis of the arbor member and are thereby adapted to be contracted or deformed toward the periphery of the arbor body. In operation, the jaws are adapted to be operatively received within an internal bore formed in the workpiece which is to be supported on the assembly, whereby the jaws are maintained under a state of compression and thus exert radially outwardly directed forces against the inner periphery of the workpiece bore so as to positively maintain the workpiece on the assembly. By virtue of the fact that the various jaws are adapted to exert uniform radially outwardly directed forces against the workpiece bore, the workpiece will be positively secured centrally of the assembly regardless of whether or not the bore is of a uniform or tapered diameter or whether or not there is any tolerance deviation or eccentricity in the bore. In a preferred construction of the present invention, two of the aforedescribed sleeve members are provided on the arbor body, whereby a workpiece will be supported by two sets of jaws that are spaced longitudinally apart from one another, thereby preventing any relative tilting or other angular displacement of the workpiece with respect to the axis of the arbor assembly.

SUMMARY OF THE INVENTION

This invention relates generally to workpiece supporting means, and more particularly, to a new and improved arbor assembly particularly adapted for operatively supporting workpieces having a preformed internal bore, aperture or opening therein.

It is accordingly a primary object of the present invention to provide a new and improved workpiece supporting arbor assembly.

It is another object of the present invention to provide a new and improved arbor assembly which is of an extremely simple design, is easy to assemble and economical to commercially manufacture.

It is a further object of the present invention to provide a new and improved arbor assembly which is adapted to function in operatively supporting workpieces having preformed cylindrical or tapered bores or passages formed therein, and which is adapted to accurately position such workpieces regardless of any minor tolerance deviations or eccentricities in the bores.

It is a further object of the present invention to provide a new and improved arbor assembly which has an absolute minimum number of moving parts, and which may be easily adapted to support workpieces of different sizes and configurations, thereby providing for universality of application.

It is still another object of the present invention to provide a new and improved arbor assembly which is adapted to function in automatically orienting a workpiece merely upon receipt or acceptance thereof within a preformed bore of opening in the workpiece, thus minimizing to the extreme the time and effort required to operatively position the workpiece preparatory to an operation being performed thereon.

Other objects and advantages of the present invention will become apparent from the following detailed description taken in conjunction with the accompanying drawing.

BRIEF DESCRIPTION OF THE DRAWING

FIG. 1 is a longitudinal cross-sectional view of a preferred embodiment of the arbor assembly of the present invention, as shown in operative association with an assembly support structure and a typical workpiece;

FIG. 2 is a transverse cross-sectional view taken substantially along the line 2—2 of FIG. 1;

FIG. 3 is a transverse cross-sectional view taken substantially along the line 3—3 of FIG. 1;

FIG. 4 is a transverse cross-sectional view taken substantially along the line 4—4 of FIG. 1;

FIG. 5 is an end elevational view of the arbor assembly illustrated in FIG. 1, as taken substantially in the direction of the arrow 5 therein;

FIG. 6 is a side elevational view of the arbor assembly embodying the principles of the present invention; and FIG. 7 is an elevated perspective view of one of the workpiece supporting sleeve members incorporated in the arbor assembly of the present invention.

DETAILED DESCRIPTION OF A PREFERRED EMBODIMENT

For purposes of clarity of description, the terms "radially inwardly," "radially outwardly" and derivatives thereof will have reference to the geometric center of the arbor assembly of the present invention and the various component parts thereof. Similarly, the terms "forwardly" and "rearwardly" will have reference to the forward and rearward ends of the arbor assembly of the present invention, with the forward end thereof being located at the right side of FIGS. 1 and 6 and the rearward end thereof being located at the left side of these FIGS.

Referring now in detail to the drawing, an arbor assembly 10, in accordance with a preferred embodiment of the present invention, is shown in operative association with a support mechanism, chuck or the like, schematically illustrated herein and designated by the numeral 12, and a typical workpiece member 14 which includes a preformed annular bore or passage 16. As will hereinafter be described in detail, the arbor assembly 10 is adapted to be partially received within the bore 16 of the workpiece 14 and thereby operatively support the workpiece 14 on the support mechanism 12 in order that some predetermined manufacturing operation may be performed thereon.

Referring now in detail to the construction of the arbor assembly 10 of the present invention, as best illustrated in FIGS. 1 and 6, the assembly 10 comprises a central body member 18 that is of a generally elongated, cylindrical configuration and is formed with a central radially outwardly extending shoulder section 20 substantially intermediate the opposite ends thereof which divides the member 18 into a workpiece support section 22 at the forward (right) end thereof and a mounting section 24 at the rearward (left) end thereof.

The shoulder section 20 of the body member 18 defines a pair of longitudinally spaced, parallel and radially outwardly extending surface portions 26 and 28 on the forward and rearward sides thereof, which surface portions 26, 28 are arranged perpendicular to the longitudinal axis of the body member 18 to provide for accurate mounting or "staging" upon operative installation thereof. The radially outermost edges of the surface portions 26, 28 are preferably chamfered or beveled, as seen at 30 and 32, to provide for corner relief, and an annular recessed portion 34 is formed adjacent the radially innermost part of the surface portion 32 to provide for noninterference with mating components, as is a common practice in the art. In a preferred construction of the body member 18, the mounting section 24 thereof is formed with a generally flat face portion or facet 36 (see FIG. 1) which is tapered radially inwardly toward the shoulder section 20 at an angle of approximately 2° from the longitudinal axis of the member 18 and is adapted to be abuttingly engaged by a suitable mounting member (not shown) and thereby provide for positive mounting of the body member 18 and effective push-pull action thereof without any relative axial movement between the member 18 and the associated support mechanism 12. Preferably, the body member 18 is formed with precision centers 38 and 40 at the forward and rearward ends thereof which are adapted to facilitate checking the assembly 10 for concentricity. It will be apparent, of course, that the relative sizes or diameters of the mounting section 24 of the body member 18 and shoulder section 20 thereof may be modified in accordance with various installation requirements, and that the diameter of the workpiece support section 22 may be varied in accordance with range demand. As will later be described in connection with the operation of the arbor assembly 10 of the present invention, the surface portion 26 together with a forward end portion 41 of the body member 18, is adapted to act as a positive workpiece stop in properly orienting the workpiece 14 when it is operatively mounted upon the assembly 10.

As best illustrated in FIG. 1, the arbor assembly 10 comprises a pair of substantially tubular-shaped workpiece arbor sleeve members, generally designated 42. Each of the sleeve members 42 comprises a mounting collar section 44 at the rearward end thereof and a workpiece supporting section 46 at the forward end thereof. More particularly, the mounting collar section 44 of the sleeve members 42 are of a generally annular configuration having an inside diameter defining an internal bore 48 adapted to receive the workpiece support section 22 of the body member 18 therewithin. In a preferred construction of the present invention, the diameters of the bores 48 are selected such that the collar sections 44 may be mounted on the body member section 22 with a shrink fit such that the sleeve members 42 may be fixedly secured to the body member 18 upon assembly thereof.

As best illustrated in FIGS. 6 and 7, the workpiece support sections 46 of the sleeve members 42 are each formed with a plurality of longitudinally extending, circumferentially spaced slots, generally designated 50, which extend forwardly from the rearward ends of the sleeve members 42. The longitudinally extending slots 50 are formed with annular recessed portions 52 at the rearward ends thereof and define therebetween a plurality of longitudinally forwardly extending jaws 54. The purpose of the annular recessed portions 52 is to obviate any sharp corners at the juncture of the jaws 54 and the mounting collar section 44 of the sleeve members 42 and thereby prevent any stress concentrations from forming in these areas to minimize the possibility of fatigue fracture. Each of the jaws 54 is formed with a radially outwardly extending workstock engaging embossed portion 56 on the radially outer side of the forwardmost end portion thereof, which embossed portion 56 define workstock engaging faces 58. The faces 58 may be either of a rounded configuration or may be tapered in a manner so as to provide for convenient workpiece acceptance and removal from the assembly 10. As best illustrated in FIG. 5, the forward end portions of the sleeve members 42 are counterbored, as seen at 60, whereby the jaws 54 are spaced radially outwardly from the outer periphery of the section 22 of the body member 18 and are thereby adapted to flex or contract inwardly upon receipt of the workpiece 14 thereon, as will later be described.

In a preferred construction of the present invention, the jaws 54 are tapered radially outwardly and forwardly at an angle of approximately 1° from the longitudinal axis of the body member 18, whereby the jaws 54 are adapted to more effectively receive and support a workpiece such as the workpiece 14 upon the assembly 10. It will be apparent, of course, that the angle of taper of the jaws 54 may be greater or less depending upon the size of the assembly 10 and the relative lengths of the jaws 54. Similarly, the number and lengths of the longitudinal slots 50 may be varied in accordance with the size and range requirements of the arbor assembly 10. However, in a preferred construction of the present invention, the sleeve members 42 are formed with six slots 50 which define a corresponding number of jaws 54.

As best illustrated in FIGS. 1 and 6, the sleeve members 42 are oriented upon the workpiece support section 22 of the body member 18 in a manner such that the mounting collar sections 44 thereof are at the rearward ends of the members 42, with the result that the jaws 54 of the rearwardmost sleeve member 42 are disposed adjacent the collar section 44 of the forwardmost member 42. With this arrangement, the jaws 54 of the sleeve members 42 are spaced longitudinally of one another and are adapted to independently flex radially inwardly and thereby support the workpiece 14 upon the assembly 10 in a manner hereinafter described in detail. The amount of flexing or contracting of the jaws 54 will be limited, of course, by the diameter of the body member section 22 and also by the outer diameter of the collar sections 44 of the sleeve members 42. Thus, the degree of flexing of the jaws 54 may be controlled by properly dimensioning the counterbore 60, as well as the diameters of the collar sections 44.

It will be noted that the arbor assembly 10 described herein, although being referred to as having two of the sleeve members 42, may be provided with three or more members 42, depending upon the size and character of the workpieces that are to be supported thereon. In general, however, at least two sleeve members 42 are provided in order to provide for support of the workpiece at two longitudinally spaced locations so as to prevent any tilting or similar angular deflection of the workpieces when they are mounted on the assembly 10. Also, it will be noted that while the two sleeve members 42 described herein are described and illustrated as being identical in size and shape, said members 42 may be of different diameters and of different lengths, depending upon the workpieces to be supported. For example, sleeve members 42 of different diameters might be desirable in the event the workpiece is formed with a stepped or counterbore.

In order to provide for preselected longitudinal positioning of the arbor sleeve members 42 along the workpiece support section 22 of the body member 18, the assembly 10 may be provided with one or more generally ring-shaped spacer members, one of which is illustrated in FIGS. 1 and 6 and designated by the numeral 62. The spacer member 62 is constructed so as to have an outside diameter substantially equal to or slightly smaller than the outside diameter of the mounting collar sections 44 of the sleeve members 42, with the result that there will be no interference between the spacer member 62 and the inner periphery of the bore 16 in the workpiece 14. The inner diameter of the spacer member 62 is selected such that the spacer member 62 may be received upon the body member section 22 with a slip-fit, whereby to provide for convenient mounting and removal thereof. It will be seen that the spacer member 62 is adapted to abut against the rearwardmost end of the collar section 44 of the rearwardmost sleeve member 42, and against a generally radially extending face portion 64 defined around the periphery of the body member section 22. It will be apparent, of course, that for certain applications, two or more of the spacer members 62 may be provided interjacent the face portion 64 and rearwardmost sleeve member 42, depending upon the range considerations involved in supporting various size workpieces upon the assembly 10.

In operation, the workpiece 14 or similar article to be supported upon the assembly 10 is oriented such that the internal bore 16 thereof is axially aligned with the forward end of the body member 18. Thereafter, the workpiece 14 is moved rearwardly, i.e. toward the left in FIG. 1, whereby the forward end of the assembly 10 is received within the end of the bore 16. The relative dimensions of the arbor sleeve members 42 are selective such that the workstock engaging faces 58 defined by the embossed portions 56 on the forward ends of the jaws 54 lie along the circumference of an imaginary circle, the diameter of which is slightly larger than the diameter of the bore 16. Consequently, as the workpiece 14 is moved rearwardly of the assembly 10, the jaws 54 are forced to flex or contract radially inwardly relative to the mounting collar sections 44 of the sleeve members 42, with the result that the forward ends of the jaw members 54 will be maintained under a state of compression within the bore 16 and will thereby exert radially outwardly directed forces against the inner periphery of the bore 16 when the workpiece is mounted in the position illustrated in FIG. 1. As previously mentioned, by virtue of the fact that the sleeve members 42 are spaced longitudinally of one another, the jaws 54 thereof will exert outwardly directed forces against the periphery of the bore 16 at two longitudinally spaced positions, thereby preventing any tilting or any relative angular displacement of the workpiece 14 on the assembly 10. This feature, together with the fact that the jaws 54 on each of the sleeve members 42 are adapted to flex or contract independently of one another, assures for positive gripping action and proper workpiece alignment.

The workpiece 14 is adapted to be moved rearwardly of the assembly 10 until the forward end 41 of the body member 18 abuts against the innermost end of the bore 16 with the result that the workpiece 14 will be positioned in the manner illustrated in FIG. 1. When the workpiece 14 is thus positioned, it will be seen that the jaw members 54 will function to exert radially outwardly directed forces uniformally around the periphery of the bore 16, with the result that the workpiece 14 will be automatically and accurately aligned coaxially of the assembly 10. Thus, the arbor assembly 10 of the present invention provides for automatic centering of the workpiece 14 by merely mounting the workpiece 14 thereon. A particular feature of the present invention resides in the fact that the aforesaid automatic centering of the workpiece 14 will be achieved whether or not the bore 16 is of a uniform diameter or is of an increasing or decreasing diameter, i.e. tapered, thereby providing for universality of application. It will be noted that if the tapered angle of the bore is slight, the two arbor sleeve members 42 may be identical in diameter; however, where the tapered angle of the bore 16 is relatively large, it may be necessary to provide the arbor sleeve members 42 in different diameters. In either case, of course, precise centering of the workpiece on the assembly 10 is assured. After the workpiece 14 has been subjected to some manufacturing operation, it will be seen that the workpiece 14 may be easily removed from the assembly 10 by exerting an axially forwardly directed force thereagainst, whereby the workpiece 14 will be removed and the jaws 54 will automatically resume their original configurations shown in FIG. 6 preparatory to the next successive workpiece being mounted on the assembly 10.

Another feature of the present invention resides in the fact that the arbor sleeve members 42 will function to automatically compensate for any tolerance deviations in the bore 16 so that the single assembly 10 will function to operatively support a number of production parts, even though these parts may vary somewhat in size within permissible production tolerances. This characteristic will be found to be a considerable improvement over various heretofore known and used devices, such as those which utilize a tapered arbor wherein the workpieces are supported at different axial positions thereon, depending upon the extent to which the workpieces are over or under sized. Still another feature of the present invention resides in the fact that the sleeve members 42 may be easily removed from the body member 18 in the event either of the members 42 become worn after extended use or in any way become damaged. Accordingly, the arbor assembly 10 of the present invention will minimize down time to the extreme in the event it is necessary to repair or replace one or more of the sleeve members 42. Yet a further feature of the present invention will be seen from the fact that the arbor assembly 10 has an absolute minimum number of moving parts. Accordingly, the assembly 10 will have a long and effective operational life.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. In a work holding member for operatively supporting a workpiece having a preformed annular opening therein:
    an annular collar section having a central opening receiving a generally cylindrical support member defining an axis;
    a plurality of substantially equally circumferentially spaced, independently flexible, workpiece engaging jaws formed integrally of said collar section and extending axially away from one end thereof and spaced radially outwardly from the outer periphery of said support member;
    each of said jaws having a workpiece engaging section on the axially outer end thereof;
    the entirety of said holding member, with the exception of said last mentioned sections, being smaller in diameter than the diameter of the preformed opening in said workpiece, with each of said sections having at least a portion thereof of a larger diameter than the diameter of said performed opening; and
    whereupon insertion of said holding member into said opening, said sections will engage the inner periphery of said opening and the adjacent ends of said jaws will be flexed radially inwardly toward said axis, whereby each of said sections will exert a resilient radially outwardly directed force against the periphery of said opening and said workpiece will thereby be supported coaxially of said support member.

2. The invention as set forth in claim 1 wherein each of said jaws is provided with a radially outwardly extending embossed portion defining a workstock engaging face, said faces lying along the circumference of an imaginary circle having a diameter greater than the diameter of the bore in the workpiece within which the assembly is to be received.

3. The invention as set forth in claim 1 wherein said jaws are tapered radially outwardly toward said workpiece engaging sections thereon.

4. The invention as set forth in claim 1 which includes at least two longitudinally spaced work holding members, said members each comprising a mounting collar section and a plurality of circumferentially spaced and longitudinally extending jaws, said holding members being mounted on said support member in a manner such that said jaws of one of the holding members are spaced longitudinally from said jaws of the other of the holding members.

5. An assembly as set forth in claim 4 which includes spacer means on said support member for spacing said holding members at preselected longitudinal positions thereon.

6. The invention as set forth in claim 1 wherein said work holding member is formed with a counterbore at a position axially aligned with said jaws, whereby said jaws are spaced radially outwardly from the outer periphery of said support member and are thereby adapted to be flexed inwardly upon insertion thereof into said opening.